Jan. 27, 1942.   H. Z. GORA   2,271,370
TIRE VALVE DEFLATOR
Filed Nov. 9, 1939
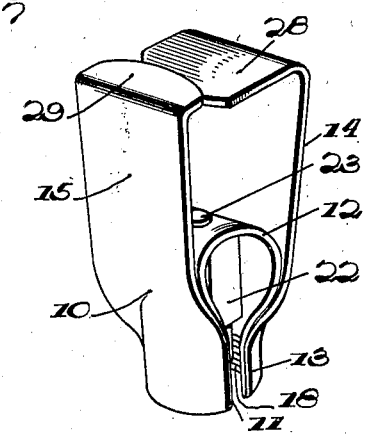
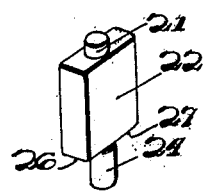
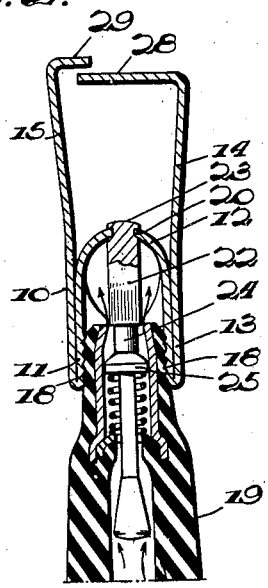
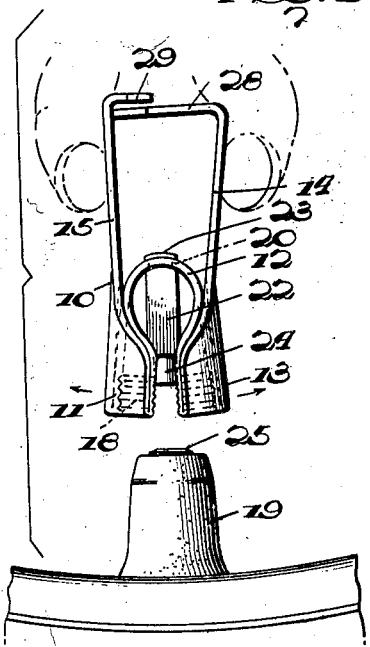
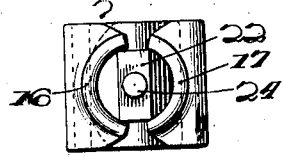
Inventor
Henry Z. Gora.
By Cameron, Kerkam & Sutton
Attorneys Patented Jan. 27, 1942

2,271,370

UNITED STATES PATENT OFFICE 2,271,370

TIRE VALVE DEFLATOR

Henry Z. Gora, Bridgeport, Conn., assignor to Jenkins Bros., New York, N. Y., a corporation of New Jersey Application November 9, 1939, Serial No. 303,669

2 Claims. (Cl. 81—15.4)

This invention relates to deflators for automobile tire valves and the like, and more particularly this invention relates to deflators for automobile tire valves suitable for use with valves in which the valve member is permanently fixed to a valve pin extending to the aperture in the outer end of the stem.

Heretofore various deflators for automobile tire valves have been proposed but all have had undesirable features. If used unskillfully these prior devices would depress the valve to such an extent as to injure the valve spring and impair the future seating of the valve. Further, these devices, if of the clamp type, were subject to frequent breakage due to excessive distortion of the spring element of the clamp.

It is accordingly an object of the present invention to provide a novel deflator for tire valves in which novel means are provided for preventing excessive distortion of the valve spring.

Another object of the present invention is to provide a novel deflator for tire valves in which novel means are provided for preventing excessive distortion of the spring element of the deflator to prevent breakage of the spring element.

Another object of the present invention is to provide a novel deflator for tire valves which is cheap to manufacture, simple, durable and compact.

Other and further objects of the present invention will appear as the description thereof proceeds.

In the accompanying drawing an illustrative embodiment of the novel deflator for tire valves of the present invention is shown but it is to be expressly understood that this embodiment is shown in the drawing and hereafter described for the puropses of illustration only and should not be construed as limiting the scope of the invention. Reference should be had to the appended claims to determine the scope of the present invention.

In the accompanying drawing

Fig. 1 is an elevation of an embodiment of the novel deflator of the present invention;

Fig. 2 is a sectional elevation of the embodiment of the present invention shown in Fig. 1;

Fig. 3 is a view of the embodiment of the present invention shown in Fig. 1 in expanded position for receiving the valve stem;

Fig. 4 is an end view of the embodiment of the present invention shown in Fig. 1; and Fig. 5 is a view of the valve operating pin and block used with the embodiment of the present invention shown in Fig. 1.

In the several figures, in which like reference characters indicate similar elements, the novel tire valve deflator of the present invention is shown as having a body portion formed from a single piece of resilient metal 10 bent back upon itself at 11, formed into a spring arch 12, bent back upon the spring arch 12 at 13 and provided with extensions 14 and 15. That portion of the device adjacent bent back portions 11 and 13 is rounded as at 16 and 17 (Fig. 4) and is internally threaded or serrated as at 18 to engage or grip the valve stem 19. Spring arch 12 is provided with a centrally located aperture 20 designed to receive a projection 21 of block 22, projection 21 being burred or upset at 23 to hold block 22 against spring arch 12. Block 22 is designed to fit within spring arch 12 and is so designed as to interfere with neither the expansive nor contractive movements of rounded portions 16 and 17. Block 22 is provided with a pin 24 designed to engage the valve pin or head 25 to depress the valve. Portions 26 and 27 of block 22 adjacent pin 24 form shoulders which engage the top of valve stem 19 (Fig. 2) to limit the inward movement of pin 24 in valve stem 19 to protect the valve spring.

Extension 14 is inwardly turned as at 28 and extension 15 is inwardly turned as at 29. Inturned portion 28 forms a stop to limit the inward movement of extensions 14 and 15 thus limiting the distortion of spring arch 12 and preventing spring arch 12 from being broken by excessive distortion.

With the illustrative embodiment of the present invention formed as above described to operate the same extensions 14 and 15 are manually pressed toward each other until inwardly turned element 28 engages extension 15 (Fig. 3). Movement of extensions 14 and 15 toward each other expands spring arch 12 and moves rounded portions 16 and 17 away from each other. The device is then pushed down upon the valve stem 19, pin 24 engaging valve pin or head 25 and depressing the valve, until shoulders 26 and 27 engage the top of valve stem 19. Extensions 14 and 15 are then released and spring arch 12 returns toward its normal position and rounded portions 16 and 17 move toward each other and engage the valve stem 19, threads or serrations 18 insuring a tight slip-proof fit (Fig. 2).

To remove the novel deflator of the present invention from the valve stem 19 extensions 14 and 15 are manually depressed moving rounded portions 16 and 17 away from each other and disengaging them from valve stem 19. The deflator is then lifted off valve stem 19, pin 24 disengaging pin or head 25 and the valve is reseated by the valve spring.

It will now be apparent that the present invention provides a novel tire valve deflator which is cheap to manufacture, simple, durable and compact and in which novel means are provided for preventing excessive distortion of the valve spring and for preventing excessive distortion of the spring element of the deflator.

To those skilled in the art changes to or modifications of the above described illustrative embodiment of the present invention will now be suggested without departing from the inventive concept of the invention. Reference should be had to the appended claims to determine the scope of the present invention.

What is claimed is:

1. A deflator having a body portion formed from a single piece of resilient material, said body portion including a pair of sections folded back upon each other to provide jaws for engaging the valve stem, each jaw being composed of inner and outer folds of said material, and a spring arch connecting the inner folds of said jaws, the outer folds of said jaws extending from said jaws on each side of said spring arch and in the same direction as said arch to provide finger engaging elements for manually opening said jaws and expanding said spring arch, and a valve engaging pin depending from said spring arch and having shoulders for engaging the top of the valve stem to limit the extent to which the valve may be forced inwardly.

2. A deflator having a body portion formed from a single piece of resilient material, said body portion including a pair of sections folded back upon each other to provide jaws for engaging the valve stem and a spring arch connecting the inner folds of said jaws, the outer folds of said jaws extending from said jaws on each side of said spring arch to provide finger engaging elements for manually opening said jaws and expanding said spring arch, a member on one of said finger engaging elements for engagement with the other of said finger engaging elements to limit the opening of said jaws and the expansion of said spring arch, and a valve engaging pin depending from said spring arch.

HENRY Z. GORA.